United States Patent [19]

Utsumi et al.

[11] 3,796,946

[45] Mar. 12, 1974

[54] NUCLEAR MAGNETIC RESONANCE SPECTROMETER

[75] Inventors: Yoshiharu Utsumi; Katsunobu Abe, both of Katsuta, Japan

[73] Assignee: Hitachi, Ltd., Tokyo, Japan

[22] Filed: Dec. 27, 1971

[21] Appl. No.: 211,877

[30] Foreign Application Priority Data
Dec. 25, 1970  Japan................................ 45-117615

[52] U.S. Cl................................................ 324/0.5 R
[51] Int. Cl. ............................................ G01n 27/78
[58] Field of Search......... 324/0.5 R, 0.5 A, 0.5 AH, 324/0.5 MA

[56] References Cited
UNITED STATES PATENTS
3,172,035   3/1965   Arnold............................ 324/0.5 R FOREIGN PATENTS OR APPLICATIONS
170,734   9/1965   U.S.S.R............................ 324/0.5 A Primary Examiner—Michael J. Lynch
Attorney, Agent, or Firm—Craig and Antonelli

[57] ABSTRACT

A sample intake means for a nuclear magnetic resonance spectrometer having a sample tube including a sample to be analyzed, a holder for supporting the sample tube, a guide provided between an inlet of the spectrometer case and a nuclear magnetic resonance signal detector for guiding the holder, strings for hanging the holder from a cover provided on the inlet so that the holder moves up and down with the opening and closing motion of the cover.

10 Claims, 4 Drawing Figures

INVENTORS
YOSHIHARU UTSUMI,
KATSUNOBU ABE

INVENTORS
YOSHIHARU UTSUMI,
KATSUNOBU ABE
BY Craig, Antonelli & Hill
ATTORNEYS

NUCLEAR MAGNETIC RESONANCE SPECTROMETER

BACKGROUND OF THE INVENTION

The present invention relates to a sample intake means for introducing into or removing a sample to be analyzed from a nuclear magnetic resonance spectrometer.

In a conventional intake means for a spectrometer, a sample is brought into a nuclear magnetic resonance signal detecting position between pole pieces of a permanent magnet or an electromagnet by manual adjustment performed by an operator. An air space large enough to insert the hand, therefore, must be provided as far as the vicinity of the detecting position. Thus, the thermal stability of the magnet is subject to deterioration thereby. These are some of the problems to be considered in the design of such an arrangement.

The resonance magnet for this purpose requires a stability and a uniformity in the magnetic field which is as high as possible. In the permanent magnet, the magnetomotive force is remarkably influenced by the temperature. Normally, the permanent magnet, therefore, must be kept at a temperature ($t$) of, for instance, 35°C., and the permitted variation of the temperature - $\Delta t$ - must be kept at not higher than $2 \times 10^{-4} \times t$.

A magnetic shield to eliminate the influence of the external magnetic field is also required. Further, it is necessary to reduce the leakage flux as much as possible.

It is, therefore, important to make the size of the sample intake means as small as possible so as to transmit as little heat as possible into the magnet. Further, it is a problem to provide the sample intake hole in the magnetic path so as not to disturb the magnetic field.

SUMMARY OF THE INVENTION

An object of the present invention is to provide a new sample intake means, in which the above-mentioned inconveniences are eliminated.

Another object of the invention is to provide the sample intake means which can set the sample smoothly into a nuclear magnetic resonance signal detecting position.

According to one aspect of the present invention, a sample tube is held by the sample tube holder, the holder being movable up and down along a guide of the holder by linkage with a cover of the guide. Further, the holder is made from a conductive material so as to provide a braking force to the holder itself.

Other objects and aspects of the present invention will become apparent upon reading the following specification taken with the accompanying drawings.

BRIEF DESCRIPTION OF THE DRAWINGS

FIG. 3a shows a longitudinal cross-sectional view for explaining the operation of the embodiment in FIG. 2a.

DETAILED DESCRIPTION OF THE PREFERRED EMBODIMENT

Figure 1:
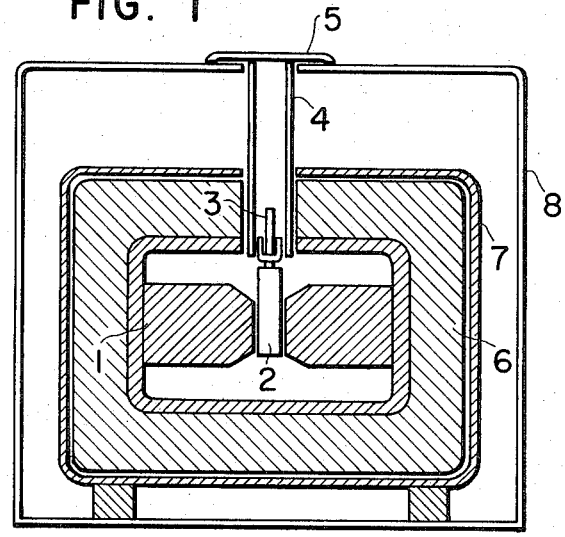
FIG. 1 shows a schematic view of the nuclear magnetic resonance spectrometer.

Before explaining the embodiment according to this invention, a simplified construction of a nuclear magnetic resonance spectrometer will be explained with reference to FIG. 1.

In this figure, numeral 1 designates a magnet (a permanent magnet in this case). A nuclear magnetic resonance signal detector 2 is arranged between pole pieces of the magnet 1. Numeral 3 designates a sample tube in which the sample is contained, which tube is placed on the detector 2 during a measurement. The sample tube 3 is inserted through a guide 4. Numeral 5 designates a cover of the guide 4. The magnet 1 is surrounded by an adiabatic material 6 in order to keep its temperature constant. Further, a magnetic shield material 7 surrounds the adiabatic material 6 to prevent the device from being influenced by an external magnetic field. The whole arrangement is enclosed within a case 8.

The present invention particularly relates to a part of the spectrometer comprising the sample tube 3, the guide 4 and the cover 5. The details of the embodiment of the present invention will be explained hereinafter.

Figure 2A:
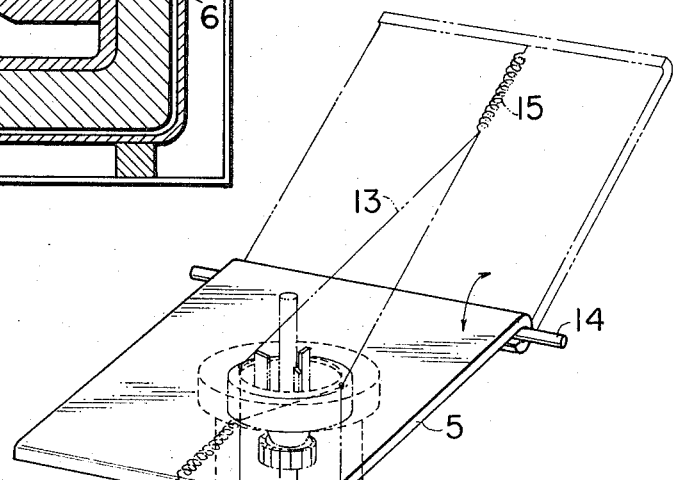
FIGS. 2a and 2b are a diagram of a sample intake means according to an embodiment of the present invention and a diagram showing a partial detail thereof, respectively.
Figure 2B:
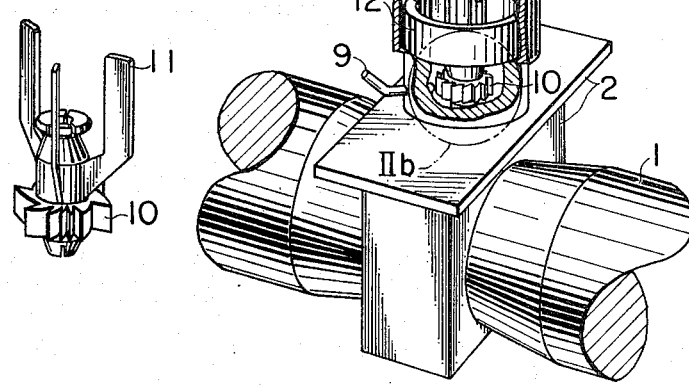

In FIG. 2a, numerals 1, 2, 3, 4, and 5 designate the same basic elements as are shown in FIG. 1. Further a nozzle 9 is provided under the lower portion of the guide 4 to blow compressed air to blades 10 of an air turbine, which is shown in detail in FIG. 2b. The air turbine comprises the blades 10 driven by compressed air and stabilizing blades 11, and the turbine is rotatably supported on a bearing member mounted on the upper plate of the detector so that the compressed air from the tube 9 will make the sample tube 3 rotate at about 3,000 r.p.m., which rotation reduces the influence owing to any inequalities in the magnetic field. The purpose of the stabilizing blade 11 is not only to provide a stabilizing of the rotation, but also to provide a stable support of the air turbine in a sample tube holder 12. It is, therefore, a desire that the number of stabilizing blades provided be three or more.

The holder 12 is slidable in tube 4 and is suspended by two hanging strings 13. The ends of the strings outside the guide 4 are connected to each other and are fixed at an open edge of the cover 5 through a spring 15. Numeral 14 denotes an axle of a hinge of the cover 5.

Figure 3:
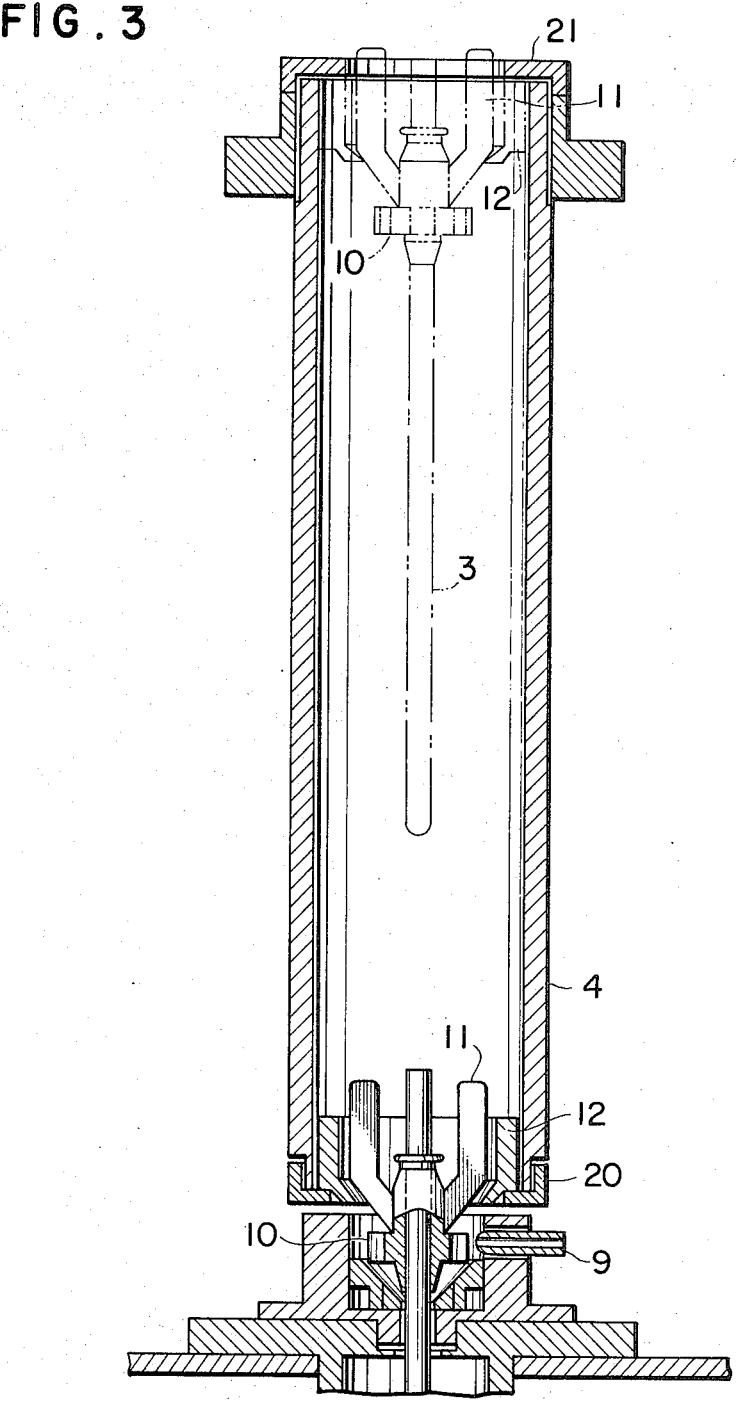

FIG. 3 shows a cross-sectional view of the above mentioned device. In this figure, numerals 20 and 21 designate a lower stopper and an upper stopper for the guide 4, respectively.

The operation of the device above described is as follows. The cover 5 opens and shuts by swinging about the axle 14 of the hinge, and the holder 12 moves up and down in response to the opening and closure of the cover 5. When the cover 5 is open, the holder 12 moves up to the upper end of the guide 4. With this upward movement of the holder 12, the sample tube 3 is removed from the detector 2, as shown by the dotted line in FIG. 2a. When the cover 5 is closed, the holder 12 moves down to the lower end of the guide 4. Then, the stabilizing blade 11 becomes free from the contact with the holder 12. The sample tube 3 is rotated by a compressed air from the nozzle 9.

When the cover 5 is opened, the holder 12 moves up to guide 4 to the upper stopper 21 and stops there. The holder 12 is then held there by the tension of the spring 15. Then, the stabilizing blades 11 are in frictional contact with the holder 12, as shown by chain lines in FIG. 3. When the cover 5 is closed, the holder 12 is supported by the lower stopper 20. However, due to the spacing between the holder 12 and the support for the sample tube 3 on the detector at this time, the stabilizing blades 11 become free from the contact with the holder 12, so that the air turbine is rotated by the compressed air from the nozzle 9. Accordingly, the sample tube 3 is also rotated during a measurement.

If the holder 12 is made from aluminum, which is light and is good conductive material, the holder 12 produces an eddy current in itself, since it links with a leakage flux of the magnet 1 when moving down along the guide 4. The eddy current generates in the holder 12 a braking force, and this eddy current becomes large as the holder 12 approaches the lower stopper 20. A setting of the sample tube 3 on the detector 2, therefore, is performed smoothly without any break-down of the sample tube 3 and the detector 2.

Having thus described the present invention, it is obvious that various modifications within the knowledge of workers in the art may be utilized without departing therefrom.

It is to be understood also that although the invention has been described with specific reference to a particular embodiment thereof, it is not to be so limited, since changes and alterations therein may be made which are within the full intended scope of this invention as defined by the appended claims.

What is claimed is:

1. In a nuclear magnetic resonance spectrometer having an exterior case with an inlet for a sample tube, magnetic field generating means enclosed in said case and a nuclear magnetic resonance signal detector for receiving said sample tube including a sample to be analyzed, a sample intake arrangement comprising a holder for supporting said sample tube, guide means provided between said inlet of said spectrometer case and said nuclear magnetic resonance signal detector for guiding said holder during movement thereof between said inlet and said detector, a cover hinged to said case to cover said inlet, and linkage means connected between said holder and said cover for moving said holder up and down within said guide means in a coordinate manner with opening and closing motion of said cover.

2. A sample intake arrangement for a nuclear magnetic resonance spectro-meter having a case, magnetic field generating means enclosed in said case and a nuclear magnetic resonance signal detector for receiving a sample tube including a sample to be analyzed, comprising a holder for supporting said sample tube, guide means provided between an inlet of said spectrometer case and said nuclear magnetic resonance signal detector for guiding said holder during movement thereof between said inlet and said detector, a cover provided on the inlet of the case, and linkage means for moving said holder up and down within said guide means in a coordinate manner with opening and closing motion of said cover further including a lower stopper mounted on said guide means for supporting said holder at one end thereof and supporting means for supporting said sample tube independently of said holder when said holder is supported by said lower stopper of said guide means so that said sample tube becomes free to move with respect to said holder.

3. A sample intake arrangement according to claim 2 wherein said sample tube is supported in said holder by an air turbine having a portion including driving blades extending outside of said holder, said supporting means including an air nozzle positioned for alignment with said driving blades when said holder is supported on said lower stopper.

4. A sample intake arrangement according to claim 3 wherein said air turbine includes a plurality of stabilizing blades which frictionally engage with said holder when said holder is moved up said guide means.

5. A sample intake arrangement according to claim 4 wherein said linkage means comprises a pair of strings, one end of each string being fixed on said holder, the other end being secured to an open edge of said cover.

6. A sample intake arrangement according to claim 5 wherein said pair of strings is connected to said cover by way of a coil spring.

7. A sample intake arrangement according to claim 1 wherein said linkage means comprises a pair of strings, one end of each string being fixed on said holder, the other end being secured to an open edge of said cover.

8. A sample intake arrangement according to claim 1 wherein said holder is made from a light-weight, conductive material.

9. A sample intake arrangement according to claim 1 wherein said sample tube is supported in said holder by an air turbine having a portion including driving blades, and further including air supply means for driving said turbine in rotation.

10. A sample intake arrangement according to claim 9 wherein said air turbine includes a plurality of stabilizing blades which frictionally engage with said holder when said holder is moved up said guide means.

* * * * *